Figure 1:
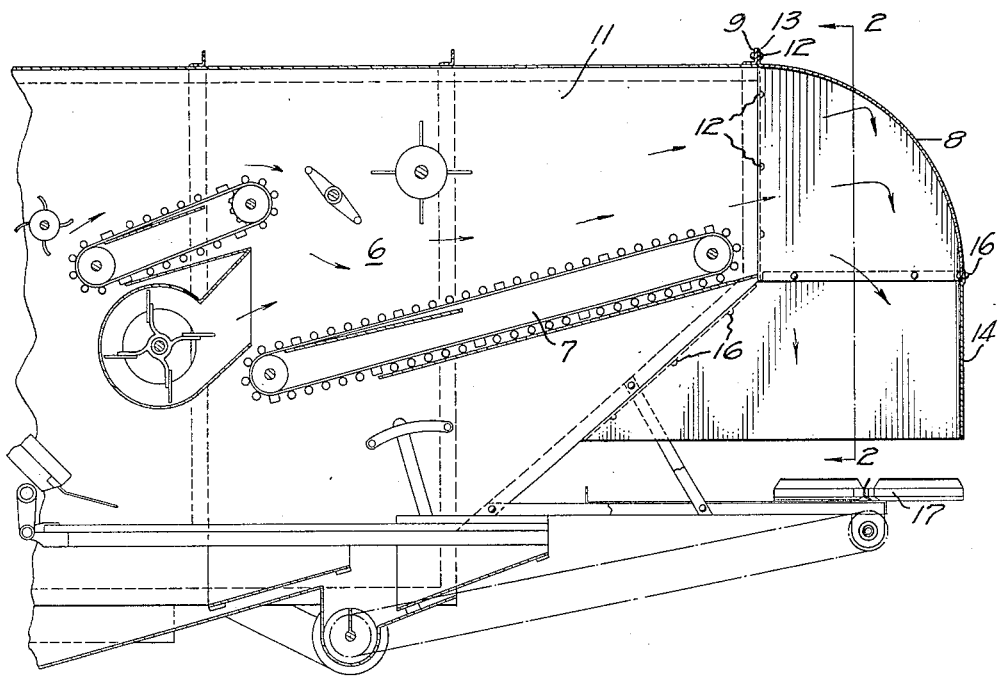

June 20, 1933.    L. H. THOEN    1,914,839
HARVESTER THRESHER
Filed Feb. 13, 1929

INVENTOR
Lowell H. Thoen
BY
White, Prost & Fryer
ATTORNEYS

Patented June 20, 1933

1,914,839

UNITED STATES PATENT OFFICE

LOWELL H. THOEN, OF STOCKTON, CALIFORNIA, ASSIGNOR TO CATERPILLAR TRACTOR CO., OF SAN LEANDRO, CALIFORNIA, A CORPORATION OF CALIFORNIA

HARVESTER THRESHER

Application filed February 13, 1929. Serial No. 339,538.

My invention relates to threshing, particularly to threshing machines operating upon a fibrous material wherein a liberal volume of straw or other waste is separated from the grain.

The straw remaining after the major portion of the grain has been separated is carried away from the separating mechanism to be further processed to remove the remaining portion of the grain and to dispose of the straw in a suitable manner. The straw possesses many chemical compounds whose presence is desirable in the soil. It is the usual practice to spread the straw evenly on the ground and subsequently plow it under, thus returning to the soil many of the valuable components which would otherwise be removed. In some instances however it is advisable to remove subsequently the straw from the field. In these cases it is desirable for the straw to be disposed of in substantially uniform windrows over the fields which are being harvested so that it may be readily picked up.

It is therefore an object of my invention to provide a means for evenly discharging the straw from the threshing machine as it moves over the field.

Another object of my invention is to facilitate the discharge of straw from a threshing machine.

The invention possesses other advantageous features, some of which with the foregoing will be set forth at length in the following description where I shall outline in full that form of the threshing machine of my invention, which I have selected for illustration in the drawing accompanying and forming part of the present specification. In said drawing I have shown one form of threshing machine embodying my invention, but it is to be understood that I do not limit myself to such form since the invention, as set forth in the claim, may be embodied in a plurality of forms.

Referring to the drawing, to which I have previously made reference, Figure 1 is a sectional view through a threshing machine embodying a form of the device of my invention.

Figure 2:
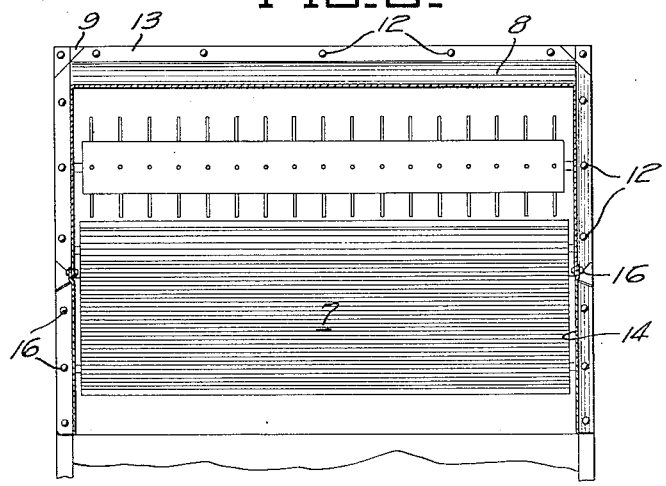

Figure 2 is a cross sectional view of the device shown in Figure 1 along the line 2—2 of Figure 1.

The device of my invention, in combination with a threshing machine, usually comprises a convenient form of means for expediting the uniform discharge of straw from the threshing machine.

In a threshing machine the grain is removed from the straw by the conventional mechanism 6, the straw carried to the tail of the threshing machine on a straw carrier 7 and discharged. Previous practice has been to provide a tail shroud or deflector over the discharge to direct the discharge of the straw. This shroud has been made of canvas partially supported on a light framework. Such a shroud structure has presented various difficulties to securing the most expedient discharge of the straw. When the machine operates during a wind the canvas flaps and whips together, the ends become entangled to form a pocket and so prevent the regular discharge of the straw. Furthermore the canvas offers considerable frictional resistance to the discharge of the straw. The tendency for the canvas tail shroud has been to make the discharge of the straw spasmodic and difficult, thus hindering the desired even distribution of the straw.

In accordance with my invention I preferably provide a rigid deflector mounted on the separator housing over the straw discharge. Thus I manufacture an arcuately shaped deflector 8 which I have expediently formed of sheet metal. This deflector is suitably attached to a flange 9 on the separator housing 11 by bolts 12 which pass through the flange 9 and a similar flange 13 on the deflector. A depending skirt 14 is also usually provided on the deflector. This skirt is preferably attached to the deflector and to the separator housing by means of bolts 16. The deflector thus forms a passageway open at the bottom, and becomes a unitary part of the separator housing.

The straw, from which all the grain or unthreshed heads have now been removed is carried on by the straw carrier 7 to the rear of the machine to be discharged. The light fluffy mass, as is indicated by the arrows, is carried rearward by a blast of air from the fan usually provided in the separator as shown in Fig. 1, which blast of air assists the straw carrier 7 in conveying the straw to an aperture in the rear end of the housing through which the straw is discharged, and is deflected downwardly by the arcuately shaped deflector mounted on the separator housing. The fluffy mass of grain which is discharged from the straw carrier gradually gives to the surfaces of the deflector and the skirt a highly polished, smooth surface. This facilitates the discharge of the straw, preventing, through the reduction in the resistance offered to its passage, the accumulation and spasmodic discharge of the straw. The rigid depending skirt prevents the wind from blowing the straw as it is discharged and prevents the wind from blowing in through the aperture in the rear end of the housing in opposition to the air blast which is forcing the straw out of the housing. The surface of the deflector acquires such a high polish that the force with which the straw is discharged from the straw carrier is readily converted into a vertical downward force without any appreciable resistance. Furthermore so little resistance is offered to the downward passage of the straw that substantially all of the force gained by its falling from the height of the straw carrier is available to carry it to the ground. Consequently the effect of any angular force components occasioned by a wind are rendered substantially negligible in comparison to the magnitude of these downward forces. The straw is therefore discharged in substantially uniform windrows on the field.

When it is desired to disperse the grain over the field a straw spreader 17 may be provided adjacent to the skirt to distribute the straw. The even discharge onto the spreader obtained by providing a closed passage for the blast of air and straw from the housing to the spreader ensures a more thorough scattering and a more uniform distribution of the straw upon the ground.

I claim:

In a threshing machine, a housing, separating mechanism therein, including a conveyor adapted to transport the straw and to permit the kernels to separate from the straw and pass through said conveyor, and a fan arranged to direct a blast of air through the straw on said conveyor in the direction in which the straw is being transported by said conveyor, said housing having a substantially vertical aperture through which the straw is blown by said fan, the discharge end of said conveyor being located adjacent the bottom of said aperture, a straw spreader adapted to scatter the straw horizontally over the ground, and a rigid shroud attached to said housing having a smooth curved surface opposite said aperture for deflecting the blast of air and straw downwardly, and a skirt extending downwardly below the horizontal plane of the bottom of said aperture and terminating above said straw spreader, the bottom of the shroud being open, said shroud forming a closed passage for the blast of air and straw from said housing to said straw spreader and serving to prevent wind from blowing through said aperture and opposing said blast of air from said fan and serving to direct said blast of air and straw vertically downward onto said straw spreader, whereby all of the straw is delivered to said straw spreader and the air blast is utilized to facilitate broadcasting of the straw by said straw spreader, the bottom edge of said shroud being spaced from said straw spreader only a sufficient amount to permit discharge of the straw by said spreader.

In testimony whereof, I have hereunto set my hand.

LOWELL H. THOEN.